United States Patent
Lepp et al.

(10) Patent No.: US 11,985,642 B2
(45) Date of Patent: *May 14, 2024

(54) TRANSITIONING BETWEEN WIDEBAND AND NARROWBAND COMMUNICATIONS

(71) Applicant: OT Patent Escrow, LLC, Chicago, IL (US)

(72) Inventors: James Randolph Winter Lepp, Ottawa (CA); Stephen McCann, Southampton (GB); Michael Peter Montemurro, Toronto (CA)

(73) Assignee: Malikie Innovations Limited, Dublin (IE)

( * ) Notice: Subject to any disclaimer, the term of this patent is extended or adjusted under 35 U.S.C. 154(b) by 589 days.

This patent is subject to a terminal disclaimer.

(21) Appl. No.: 17/188,245

(22) Filed: Mar. 1, 2021

(65) Prior Publication Data

US 2021/0185678 A1 Jun. 17, 2021

Related U.S. Application Data

(63) Continuation of application No. 15/261,023, filed on Sep. 9, 2016, now Pat. No. 10,973,026.

(51) Int. Cl.
*H04W 72/04* (2023.01)
*H04L 5/00* (2006.01)
(Continued)

(52) U.S. Cl.
CPC ....... *H04W 72/0453* (2013.01); *H04L 5/0042* (2013.01); *H04L 5/0096* (2013.01);
(Continued)

(58) Field of Classification Search
CPC . H04W 72/0453; H04W 72/21; H04W 72/23; H04W 28/20; H04W 84/12; H04L 5/0096; H04L 5/0042
See application file for complete search history.

(56) References Cited

U.S. PATENT DOCUMENTS 6,160,852 A * 12/2000 Grube ................... H04B 1/406
375/256
10,027,462 B2 * 7/2018 Jiang ..................... H04L 5/0007
(Continued)

FOREIGN PATENT DOCUMENTS

CN 101184007 A 5/2008
CN 103828457 A 5/2014

OTHER PUBLICATIONS

IEEE Standards Association, IEEE Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications, IEEE Std 802.11 2012, 2793 pages.
IEEE 802.11.11-15/1181r0, IEEE P802.11 Wireless LANs, Long Range Low Power (LRLP) Operation in 802.11: Use Cases and Functional Requirements: Guidelines for PAR Development, Mar. 2016 (10 pages).

(Continued)

*Primary Examiner* — Brian D Nguyen
(74) *Attorney, Agent, or Firm* — Botos Churchill IP Law LLP

(57) ABSTRACT

A wireless device sends, to an access point, an indication to the access point that the wireless device is to transition between a wideband communication and a narrowband communication.

19 Claims, 8 Drawing Sheets

(51) Int. Cl.
  *H04W 72/0453* (2023.01)
  *H04W 72/21* (2023.01)
  *H04W 72/23* (2023.01)
  *H04W 28/20* (2009.01)
  *H04W 84/12* (2009.01)

(52) U.S. Cl.
  CPC ........... *H04W 72/21* (2023.01); *H04W 72/23* (2023.01); *H04W 28/20* (2013.01); *H04W 84/12* (2013.01)

(56) References Cited

U.S. PATENT DOCUMENTS

| | | | | |
|---|---|---|---|---|
| 10,117,244 | B2* | 10/2018 | Ratasuk | H04W 72/0453 |
| 10,149,209 | B2 | 12/2018 | Lepp | |
| 2004/0242230 | A1* | 12/2004 | Rue | H04W 92/02 455/426.2 |
| 2005/0078707 | A1 | 4/2005 | Maltsev | |
| 2005/0245258 | A1 | 11/2005 | Classon | |
| 2006/0039341 | A1 | 2/2006 | Ptasinski et al. | |
| 2007/0243839 | A1 | 10/2007 | Kostic | |
| 2008/0112369 | A1 | 5/2008 | Kwon | |
| 2008/0112370 | A1 | 5/2008 | Kwon | |
| 2012/0076091 | A1 | 3/2012 | Seok | |
| 2013/0120665 | A1* | 5/2013 | Anandakumar | H04N 5/50 348/731 |
| 2015/0200855 | A1* | 7/2015 | Overcash | H04L 47/11 370/235 |
| 2016/0127991 | A1* | 5/2016 | Ang | H04W 52/0206 455/522 |
| 2017/0201905 | A1* | 7/2017 | Trainin | H04L 1/1614 |

OTHER PUBLICATIONS

IEEE 802.11-16/0024r0, IEEE P802.11 Wireless LANs, Proposed TGax draft specification, Jan. 2016 (147 pages).
Table of Contents and Selected Pages from IEEE 802.11-REVmc/D5.0, IEEE P802.11-REVmcTM/D5.0, Draft Standard for Information technology—Telecommunications and information exchange between systems Local and metropolitan area networks—Specific requirements, Part 11: Wireless LAN Medium Access Control (MAC) and Physical Layer (PHY) Specifications, Jan. 2016 (134 pages).
IEEE P802.11-REVmc/D6.0, Reason Codes, Jun. 2016 (4 pages).
Ghosh et al., IEEE 802.11-15/1108r0, Technical Feasibility for LRLP, Sep. 14, 2015 (10 pages).
Eng Hwee Ong, ResearchGate, Conference Paper, Performance analysis of fast initial link setup for IEEE 802.11ai WLANs, Sep. 2012 (7 pages).
Weiping Sun et al., IEEE 802.11ah: A Long Range 802.11 WLAN at Sub 1 GHZ, Journal of ICT Standardization, vol. 1, 83-108, May 14, 2013 (26 pages).
Yakun Sun et al., Considerations on LRLP Tranmissions, doc.: IEEE 802.11.11-16, Jan. 2016 (10 pages).
Texas Instruments Inc., 3GPP TSG RAN WG2 Meeting #55, R2-062835, Efficient and Dynamic Uplink Resource Requirement Reporting in LTE, Oct. 2006 (4 pages).
European Patent Office, International Search Report and Written Opinion for PCT/EP2017/071195 dated Nov. 28, 2017 (14 pages).
European Patent Office, Communication pursuant to Article 94(3) EPC for Appl. No. 17758850.6 dated Dec. 9, 2019 (5 pages).

* cited by examiner

TRANSITIONING BETWEEN WIDEBAND AND NARROWBAND COMMUNICATIONS

CROSS REFERENCE TO RELATED APPLICATION

This is a continuation of U.S. application Ser. No. 15/261,023, filed Sep. 9, 2016, which issued as U.S. Pat. No. 10,973,026 on Apr. 6, 2021, and is hereby incorporated by reference.

BACKGROUND

Devices such as computers, handheld devices, or other types of devices can communicate over wired or wireless networks. Wireless networks can include a wireless local area network (WLAN), which includes wireless access points (APs) to which devices are able to wirelessly connect. Other types of wireless networks include cellular networks that include wireless access network nodes to which devices are able to wirelessly connect.

BRIEF DESCRIPTION OF THE DRAWINGS

Some implementations of the present disclosure are described with respect to the following figures.

DETAILED DESCRIPTION

Figure 1:
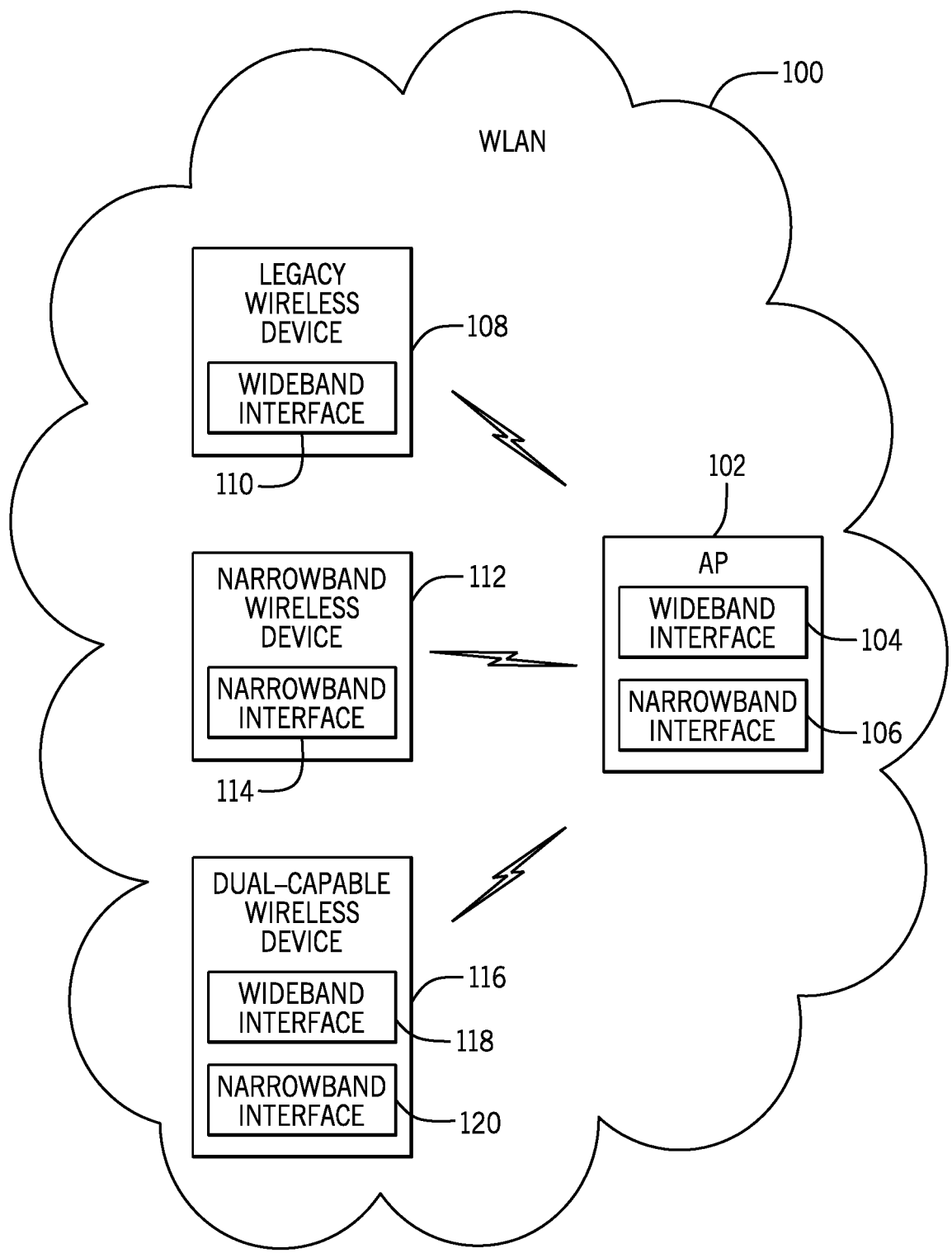
FIG. 1 is a block diagram of an example network arrangement according to some implementations.

In a wireless local area network (WLAN), a wireless device (which can also be referred to as a client device) may communicate with one or multiple wireless access points (APs). A wireless AP (or more simply, an AP) can refer to a communication device to which a wireless device can establish a wireless connection to communicate with other endpoint devices. WLANs can include wireless networks that operate according to the Institute of Electrical and Electronic Engineers (IEEE) 802.11 specifications. In other examples, WLANs can operate according to other protocols. More generally, techniques or mechanisms according to some implementations of the present disclosure can be used with other types of wireless networks, such as cellular networks or other wireless networks.

Examples of wireless devices include computers (e.g., tablet computers, notebook computers, desktop computers, etc.), handheld devices (e.g., smart phones, personal digital assistants, etc.), wearable devices (smart watches, electronic eyeglasses, virtual reality headsets, etc.), game appliances, health monitors, vehicles (or equipment in vehicles), or other types of endpoint or user devices that are able to communicate wirelessly.

In some examples, the channel widths of a frequency channel used in communications over a WLAN that operates according to the IEEE 802.11 specifications can be 20 megahertz (MHz) or 40 MHz. A WLAN can employ 20 MHz (or 40 MHz) channels in the 2.4 gigahertz (GHz) frequency band, in some examples. Although reference is made to specific example channel widths and frequency bands, it is noted that in other examples, techniques or mechanisms according to some implementations can be used with other channel widths and frequency bands.

In the present disclosure, a WLAN that operates using 20 MHz or 40 MHz channels (or frequency channels of other widths) can be referred to as a wideband WLAN. Channels used by a wideband WLAN can be referred to as wideband channels.

The Long Range Low Power (LRLP) technology for WLAN communications has been proposed for IEEE 802.11. LRLP is also known as Wake Up Radio (WUR) or IEEE 802.11ba or IEEE 802.11bb. LRLP uses frequency channel widths that are less than the channel width of a wideband WLAN. For example, LRLP can employ channel widths of approximately 2 MHz. In other examples, a narrowband channel can have a channel width of approximately 1 MHz, 5 MHz, 10 MHz, or any other width that is less than the channel width of a wideband channel. A frequency channel that has a channel width less than that of the frequency channel used in a wideband WLAN can be referred to as a narrowband channel.

More generally, a narrowband WLAN can refer to a WLAN in which communications between stations (STAs) or between a STA and an AP can employ a frequency channel having a channel width (or frequency range) less than the channel width (or frequency range) of a channel used by a wideband WLAN. According to IEEE 802.11, a STA is a device that has the capability to use the 802.11 protocol. A STA can be an AP, or alternatively, a STA can be a non-AP STA, such as any of the wireless devices discussed above.

In some examples, a narrowband WLAN uses a narrowband channel that is physically located within the wideband channel of a wideband WLAN. In other words, the narrowband channel of the narrowband WLAN is a subset of a wideband channel of a wideband WLAN. The narrowband channel can also be considered to be a sub-channel of the wideband channel. In some examples, the narrowband channel can be centered around the same center frequency as the wideband channel. In other examples, the narrowband channel does not have to be centered around the same center frequency as the wideband channel. In yet further examples, the narrowband channel may be an orthogonal frequency-division multiple access (OFDMA) allocation block.

Although reference is made to wideband WLANs and narrowband WLANs, it is noted that techniques or mechanisms according to some implementations can also be used with other types of wireless networks that can include wideband wireless networks and narrowband wireless networks, with a wideband wireless network using a wideband channel and a narrowband wireless network using a narrowband channel that is a subset of the wideband channel.

FIG. 1 shows an example WLAN 100 that includes an AP 102. Although just one AP is depicted in FIG. 1, it is noted that the WLAN 100 can include multiple APs. If the wireless network 100 is a cellular access network, then the AP 102 can be considered a wireless access network node, such as an eNodeB or a base station.

The AP 102 is able to serve both wireless devices communicating in wideband channels and wireless devices communicating in narrowband channels. The AP 102 includes a wideband interface 104 to communicate with wireless devices over wideband channels, and a narrowband interface 106 to communicate with wireless devices over narrowband channels. The wideband interface 104 can include a physical layer (PHY) and a Medium Access Control (MAC) layer (which is a layer 2 above the physical layer). The MAC/PHY layers of the wideband interface 104 are configured to communicate over the wideband channels. Similarly, the narrowband interface 106 includes a PHY and a MAC layer, which are configured to operate in narrowband channels.

Several types of wireless devices are depicted in FIG. 1. A legacy wireless device 108 includes a wideband interface 110 to communicate over wideband channels. The legacy wireless device 108 is a wireless device that is able to operate in the wideband channels, but not in the narrowband channels. The legacy wireless device 108 may also be capable of operating in other channels (e.g., using other non-WLAN interfaces).

A narrowband wireless device 112 includes a narrowband interface 114 to communicate with the AP 102 over narrowband channels. A narrowband wireless device 112 is not able to communicate over wideband channels. The narrowband wireless device 112 may also be capable of operating in other channels (e.g., using other non-WLAN interfaces).

A dual-capable wireless device 116 includes both a wideband interface 118 and a narrowband interface 120. The dual-capable wireless device 116 is able to communicate over either wideband channels or narrowband channels. The dual-capable wireless device 116 may also be capable of operating in other channels (e.g., using other non-WLAN interfaces).

The dual-capable wireless device 116 is able to selectively operate in either a wideband communication mode or a narrowband communication mode. In the wideband communication mode, the wireless device 116 communicates with the AP 102 using a wideband channel, while in the narrowband communication mode, the wireless device communicates with the AP 102 using a narrowband channel. In some examples, a time-based sharing of a full channel is performed between narrowband and wideband communication modes; in other words, the AP 102 communicates with wireless devices in narrowband channels at designated (e.g., scheduled or predefined) time intervals, while in other time intervals, the AP 102 communicates with wireless devices using wideband channels.

A dual-capable wireless device (e.g., 116) that is capable of both narrowband and wideband communication modes can be viewed in one of two different ways. In some examples, the wireless device can be a low power wireless device that has additional wideband communication capabilities used to speed up or otherwise enhance system acquisition and improve data transfer rates. In other examples, the wireless device is a regular WLAN wireless device that has additional narrowband capabilities to enhance power savings or to increase communication range. When an STA (either a wireless device or an AP) operates in the narrowband communication mode, power savings can be achieved due to lower power consumption associated with communications over a narrowband channel, and because the narrowband interface can use a low duty cycle (e.g., a narrowband transceiver of the STA is turned off for a longer period of time as compared to a wideband transceiver).

Various issues can arise relating to operations in a WLAN (or other wireless network) in which wireless devices and APs are able to operate in multiple communication modes, including the wideband communication mode and the narrowband communication mode.

Issue 1

Issue 1 relates generally to how the AP can be made aware of a current communication mode (wideband communication mode or narrowband communication mode) of a wireless device. Current IEEE 802.11 LRLP designs specify an AP serving either wideband or narrowband wireless devices, and do not specifically address the case of an AP that is able to serve a wireless device (such as the dual-capable wireless device 116 of FIG. 1) that is able to operate in both the wideband and narrowband communication modes. The AP has to know what communication mode (wideband communication mode or narrowband communication mode) the dual-capable wireless device is in at all times so that the AP can transmit to the dual-capable wireless device using a correct channel (either a wideband channel or narrowband channel). In some examples, if the dual-capable wireless device chooses to transition from the narrowband communication mode to the wideband communication mode in the middle of a long paging or sleep cycle (during which the transceiver of the wireless device is powered off), the AP may lose connectivity with the wireless device. Even if connectivity is not lost, the AP has to know which communication mode the wireless device is using, so that the AP can transmit information to the wireless device using the appropriate channel (wideband channel or narrowband channel). The AP also has to handle the situation in which downlink data packets are queued when a wireless device operating in narrowband communication mode is sleeping— such downlink data packets have to be delivered immediately after a client-initiated transition to the wideband communication mode.

Issue 2

Issue 2 relates to the length of time associated with discovering a narrowband WLAN by a wireless device. A wireless device, such as the dual-capable wireless device 116, is able to perform scanning for both narrowband and wideband WLANs. Scanning can include passive scanning, where the wireless device can tune the wireless device's receiver to a particular channel (either the narrowband channel or wideband channel). In passive scanning, the wireless device decodes received frames from an AP to look for a Beacon frame. A "frame" refers to a unit of information that can be communicated wirelessly between a wireless device and a WLAN. A Beacon frame is periodically sent by an AP, and contains information to allow a wireless device to discover a WLAN.

Alternatively, scanning can include active scanning, in which a wireless device sends, to an AP, a Probe request, and waits for a Probe response from the AP. Passive scanning or active scanning can take a relatively long period of time, especially to discover a narrowband WLAN. The amount of time that is involved in detecting a narrowband WLAN can be multiplied by the number of available narrowband channels. If there are multiple narrowband channels, then a wireless device may have to scan each of the narrowband channels. Spending a relatively long period of time scanning for a WLAN can consume battery power of the wireless device, and can lead to delays in communications.

1. Solutions Relating to Transitioning Between Narrowband and Wideband Communication Modes The following describes example solutions that can be used to address Issue 1 discussed above.

Figure 2:
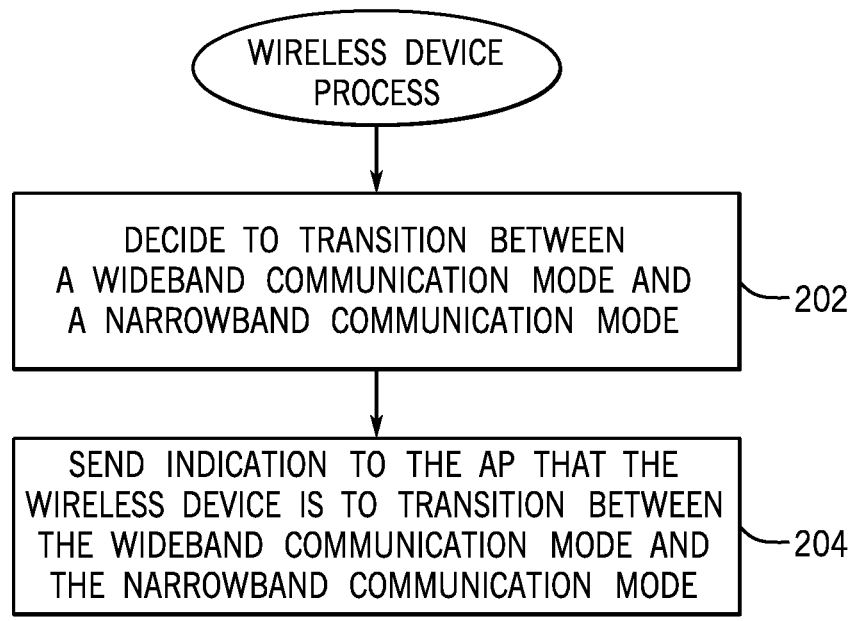
FIG. 2 is a flow diagram of an example process performed by a wireless device according to some implementations.

FIG. 2 is a flow diagram of an example process that can be performed by a wireless device, such as the wireless device 116, according to some implementations. The wireless device decides (at 202) to transition between the wideband communication mode and the narrowband communication mode. Thus, in some examples, the wireless device can decide to transition from the narrowband communication mode to the wideband communication mode, while in other examples, the wireless device can decide to transition from the wideband communication mode to the narrowband communication mode. The decision to transition between the wideband communication mode and the narrowband communication mode can be based on various factors, such as one or more of the following: enter a lower power mode (the narrowband communication mode) to reduce power consumption at the wireless device, increase a communication range of the wireless device by entering the narrowband communication mode, enter the wideband communication mode to achieve higher data communication rates, and so forth.

In response to the decision to transition between the wideband communication mode and the narrowband communication mode, the wireless device sends (at 204) an indication to the AP (e.g., the AP 102 of FIG. 1) that the wireless device is to transition between the wideband communication mode and the narrowband communication mode.

The indication sent to the AP can be an indication that the wireless device is to transition from the wideband communication mode to the narrowband communication mode, or from the narrowband communication mode to the wideband communication mode. By sending the indication, the AP is able to determine the communication mode to use to communicate with the wireless device, so that the AP is able to send data to the wireless device using the appropriate one of a wideband channel or a narrowband channel.

Figure 3:
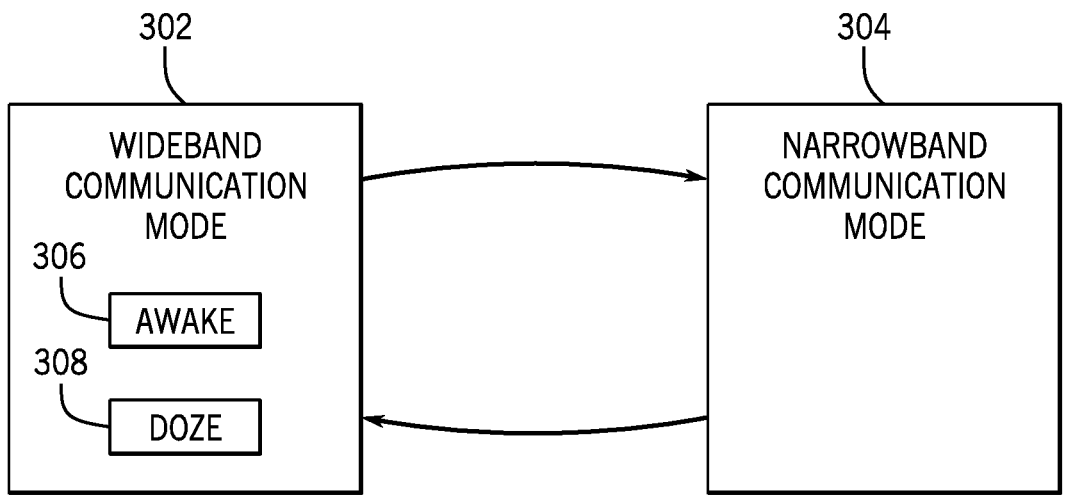
FIG. 3 is a state diagram illustrating transitions between communication modes of a wireless device according to some implementations.

FIG. 3 is a state diagram that illustrates transitions between the wideband communication mode 302 and the narrowband communication mode 304 by a wireless device that is able to perform both wideband and narrowband communications. In some examples, the wideband communication mode 302 has an awake state 306 and a doze state 308. The awake state 306 is an active state of the wireless device when in the wideband communication mode 302. The doze state 308 is a power savings state in which certain components of the wireless device, such as the wireless device's transmitter and/or receiver, have been powered off.

The narrowband communication mode 304 is considered a power save state when compared to the awake state 306 of the wideband communication mode 302. Although not shown in FIG. 3, the narrowband communication mode 304 may have one or more sub-states that operate at respective different power levels.

In some examples, the operation of the narrowband communication mode 304 differs from the operation of the doze state 308 of the wideband communication mode 302 in some aspects. When a wireless device transitions to the doze state 308, the wireless device sends a message to an AP informing the AP that the wireless device has entered the doze state 308. From that point on, the AP does not immediately send data frames to the wireless device, but instead queues the data frames. The AP can send an indication (such as a flag in a Downlink Traffic Indication Map or DTIM that is part of a Beacon frame) to the wireless device that there is data pending. The wireless device in the doze state 308 can periodically power on its receiver to receive and decode the indication (such as the DTIM in the Beacon frame). In response to the indication that there is data pending for the wireless device, the wireless device can transition from the doze state 308 to the awake state 306 to receive the data from the AP.

In contrast, in the narrowband communication mode 304, the wireless device does not have to monitor Beacon frames sent on a wideband channel.

In some implementations, transitions between the wideband communication mode 302 and the narrowband communication mode 304 can involve use of four different types of indications (sent at 204 in FIG. 2):

(1) an indication to transition from the wideband communication mode 302 to the narrowband communication mode 304, (2) an indication to transition from the narrowband communication mode 304 to the wideband communication mode 302, (3) a direct transition from the narrowband communication mode 304 to the wideband communication mode 302, and (4) a direct transition from the wideband communication mode 302 to the narrowband communication mode 304.

The use of these four different types of indications are discussed further below in sections 1.1, 1.2, 1.3, and 1.4.

In some examples, a narrowband and wideband WLAN operates as a single basic service set (BSS) from the perspectives of usage of a MAC address and an association state between a client STA (non-AP STAs) and an AP. A BSS refers to a network that includes a single AP and one or more client STAs associated with the AP.

As the wideband and narrowband PHYs of a STA (either a client STA or an AP) operate as a single BSS, once a client STA associates with the AP, the same association between the client STA and the AP is maintained (and does not change) in response to transitions between the wideband and narrowband communication modes. In this case, the same association can apply to authentication and mobility parameters, or just authentication parameters.

The AP can maintain communication mode information (or more generally, status information) for all client STAs that are associated with the AP. The communication mode information maintained by the AP for a given client STA can indicate to the AP whether the given STA is operating in the wideband communication mode or the narrowband communication mode. In some examples, the storage of the communication mode information may be based on the MAC address of the given client STA, where the MAC address is a global identifier of the client STA. Thus, based on a specific MAC address that corresponds to a respective client STA, the AP is able to retrieve the corresponding communication mode information to determine the communication mode currently used by the respective STA. In other examples, the communication mode information can be associated with an association identifier (AID), which is a local address assigned to each client STA by the AP (e.g., a number between 1 and 2007).

In some examples, a client STA operating in a first communication mode (wideband communication mode or narrowband communication mode) can send an indication on the current communication interface (wideband communication interface or narrowband communication interface) to set up the transition to a second, different communication mode (narrowband communication mode or wideband communication mode). Such operations are described below in sections 1.1 and 1.2.

In other examples, the client STA operating in a first communication mode (wideband communication mode or narrowband communication mode) can immediately transmit on the other communication interface (narrowband communication interface or wideband communication interface), where the transmission on the other communication interface provides an indication of a transition between the wideband communication mode and narrowband communication mode. Such operations are described below in sections 1.3 and 1.4.

Although communication mode transitions are described as being initiated by a client STA (or another client device), it is noted that in other examples, an AP can trigger a client STA (or another client device) to perform the communication mode transition.

In some examples, if a client STA is currently in the wideband communication mode, the regular WLAN (active state or doze state) procedure for delivering downlink frames from the AP to the client STA can be used, where the downlink frames are queued or transmitted to the client STA as appropriate according to the IEEE 802.11 specifications. If the STA is currently in the narrowband communication mode, any downlink frames can be queued until the time when the AP is operating in the narrowband communication mode, at which time the downlink frames can be transmitted to the client STA.

1.1. Indication of Transitioning from the Wideband Communication Mode to the Narrowband Communication Mode This section describes examples where the indication that is sent (at 204) in FIG. 2 by the wireless device to an AP is an explicit indication to transition from the wideband communication mode to the narrowband communication mode.

Figure 4:
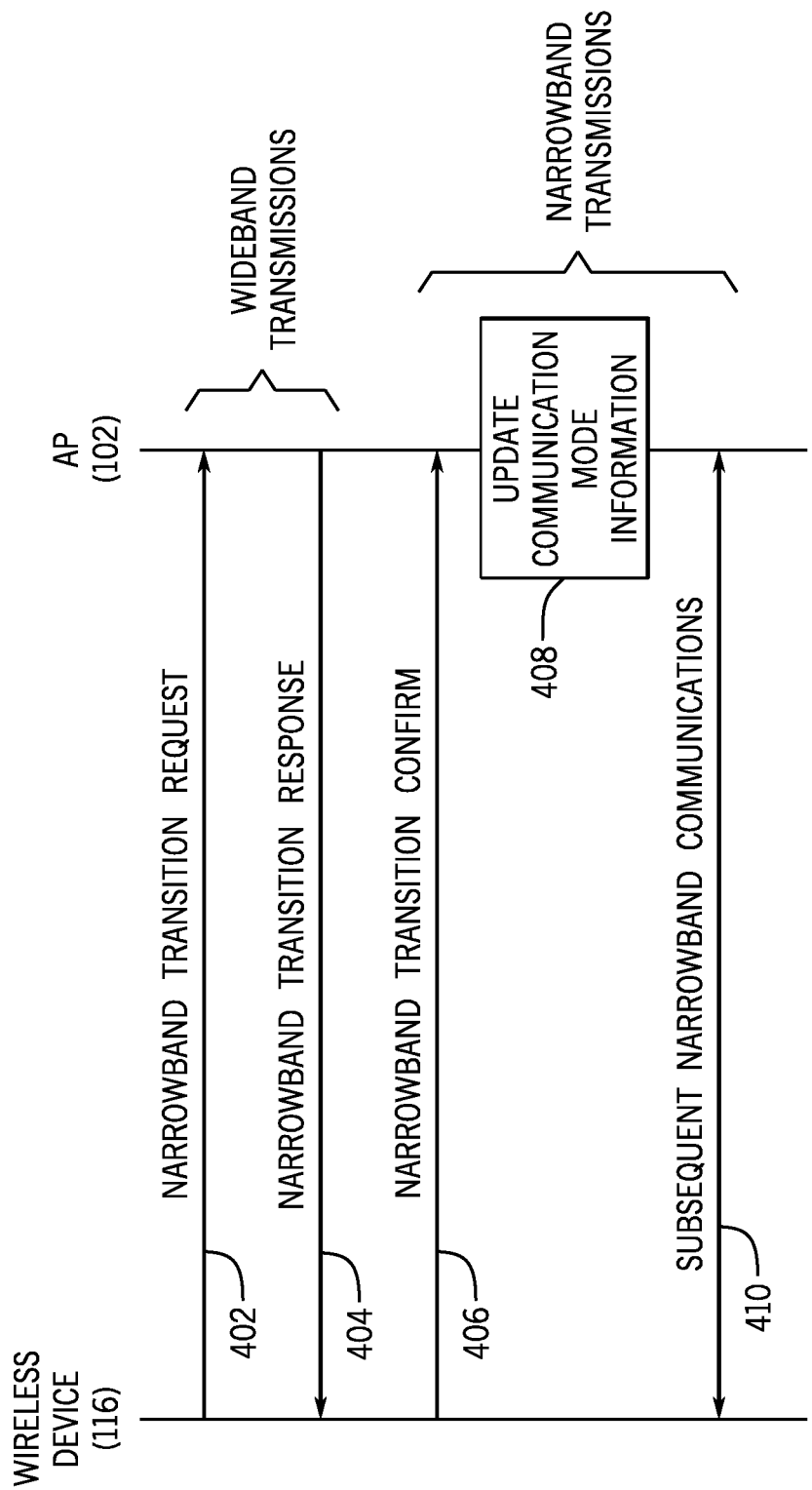
FIGS. 4-7 are flow diagrams illustrating transitions between wideband and narrowband communication modes, according to some implementations.

As shown in FIG. 4, the indication is in the form of a narrowband transition request sent (at 402) by the wireless device 116 to the AP 102. The sending of the narrowband transition request can be initiated by the wireless device 116, or alternatively, can be triggered by the AP 102 sending a trigger message (not shown) to the wireless device 116. The wireless device 116 can accept or reject the trigger message, and in the case that the wireless device 116 rejects the trigger message, the wireless device 116 can send a reason code, such as a reason code specified in Section 9.4.1.7 of IEEE 802.11-REVmc/D6.0, or another reason code. The reason code is also known as a status code.

The narrowband transition request is sent from the wireless device 116 to the AP 102 over a wideband network (using a wideband channel) to inform the AP 102 of the wireless device's intended transition from the wideband communication mode to the narrowband communication mode.

The AP 102 responds to the narrowband transition request by sending (at 404) to the wireless device 116 a narrowband transition response over the wideband network. The AP 102 may accept or reject the narrowband transition request, and can indicate the acceptance or rejection in the narrowband transition response.

Assuming that the AP 102 accepts the narrowband transition request, the AP 102 can begin queueing downlink frames for the wireless device 116 after transmitting the narrowband transition response, such that the queued downlink frames will be delivered using the narrowband network according to whichever power saving scheme is being used by the wireless device 116 on the narrowband network.

In response to the narrowband transition response (and assuming the narrowband transition response contains an acceptance indication that accepts the narrowband transition request), the wireless device 116 sends (at 406) a narrowband transition confirm to the AP 102 over a narrowband network (using a narrowband channel), to indicate a successful transition to the narrowband communication mode.

The narrowband transition confirm is sent on the narrowband network to indicate a successful transition by the wireless device 116 to the narrowband communication mode. In some cases, there can be delay between the narrowband transition response and the narrowband transition confirm, because the wireless device 116 may have to wait to transmit the narrowband transition confirm until the AP 102 is operating in the narrowband communication mode.

In response to the narrowband transition confirm, the AP 102 updates (at 408) the communication mode information for the wireless device 116, to indicate that the wireless device 116 is now operating in the narrowband communication mode. In some examples, the communication mode information can be stored in a communication mode information table (or other data structure), where different entries of the communication mode information table can store communication mode information for different wireless devices.

In some examples, the narrowband transition request can include a reason code that can indicate a reason for the request to transition from the wideband communication mode to the narrowband communication mode. The reason code can include information in an information element of the narrowband transition request. The reason code in the narrowband transition request can specify any of the following reasons for requesting the transition to the narrowband communication mode: reducing power, low battery, low signal-to-noise ratio, reducing required bandwidth, etc. The narrowband transition request can also include a requested sleep cycle length (the amount of time that the no data transmission is occurring) and other parameters of the low-power narrowband communication mode.

The narrowband transition response can include information about operation of the narrowband network (and how the wireless device should access the narrowband network) such as any or some combination of the following: narrowband transmit period duration, narrowband transmit period cycle duration, channel width, which particular sub-channel (i.e., which of the narrowband channels within a wideband channel) to operate on, etc. In examples where some of the foregoing information relating to narrowband communication is dynamic, the narrowband transition response can include the most up-to-date values of the information at the time of the transition to the narrowband communication mode.

If the AP 102 rejects the narrowband transition request, then the narrowband transition response includes an indication of the rejection of the narrowband transition request, and a reason code for the rejection. Reason codes such as those specified in Section 9.4.1.7 of IEEE 802.11-REVmc/D6.0 can be used. In further examples, additional reason codes can be used in the narrowband transition response. There can be two categories of reason codes: a first category of reason codes that allows for future narrowband transition request from the wireless device 116, and a second category of reason codes that bars future narrowband transition requests.

Subsequent to sending the confirm message the wireless device 116 continues to perform subsequent narrowband communications (at 410) with the AP 102 in the narrowband communication mode until a transition to the wideband communication mode is performed.

In some examples, the format of a narrowband transition request can be as follows:

| | Element ID | Length | Narrowband Features | Narrowband Parameters |
|---|---|---|---|---|
| Octets: | 1 | 1 | 2 | variable |

The wireless device can set the Narrowband Features field of the narrowband transition request to a value indicating which features of the narrowband communication mode are being requested. The features can include Low Power, Ultra Low Power, Long Range, etc. For example, like the wideband network, the narrowband network may have different levels of power save features that are available for use.

The wireless device can set the Narrowband Parameters field of the narrowband transition request to indicate PHY and MAC features, such as receive/transmit (Rx/Tx) power levels, forward error correction (FEC), encoding, modulation, window size, preamble, etc. The features included in the Narrowband Parameters field may be the full list the wireless device is capable of supporting, or the features included in the Narrowband Parameters field may be a subset of the supported capabilities that the wireless device intends to use at this time.

In some examples, the format of a narrowband transition response can be as follows:

| | Element ID | Length | Status Code | Narrowband Schedule | Length | Narrowband Parameters |
|---|---|---|---|---|---|---|
| Octets: | 1 | 1 | 1 | variable | 1 | variable |

The Status Code field of the narrowband transition response contains a first value (e.g., 0) if the transition is accepted. If the transition is rejected, the Status Code field contains a value that describes the reason for failure to transition, such as reason codes described in section 9.4.1.7 of IEEE 802.11-REVmc/D6.0.

The Narrowband Schedule field of the narrowband transition response contains the parameters of a power save sleep cycle in the narrowband network.

The AP sets the Narrowband Parameters field to indicate PHY and MAC features, such as Rx/Tx power levels, FEC, encoding, modulation, window size, preamble, etc. The AP can send a subset of the parameters that were in the request from the wireless device. The AP does not send parameters the wireless device does not support. If the AP cannot support the parameters indicated in the narrowband transition request from the wireless device, the AP should send one of the failure reasons as the Status Code.

In some examples, the format of a narrowband transition confirm can be as follows:

| | Element ID | Length | Confirmation |
|---|---|---|---|
| Octets: | 1 | 1 | 1 |

The Confirmation field of the narrowband transition confirm contains a flag to indicate that the wireless device has successfully transitioned to the narrowband communication mode.

1.2 Indication of Transitioning from the Narrowband Communication Mode to the Wideband Communication Mode This section describes examples where the indication that is sent (at 204) in FIG. 2 by the wireless device to an AP is an explicit indication to transition from the narrowband communication mode to the wideband communication mode.

Figure 5:
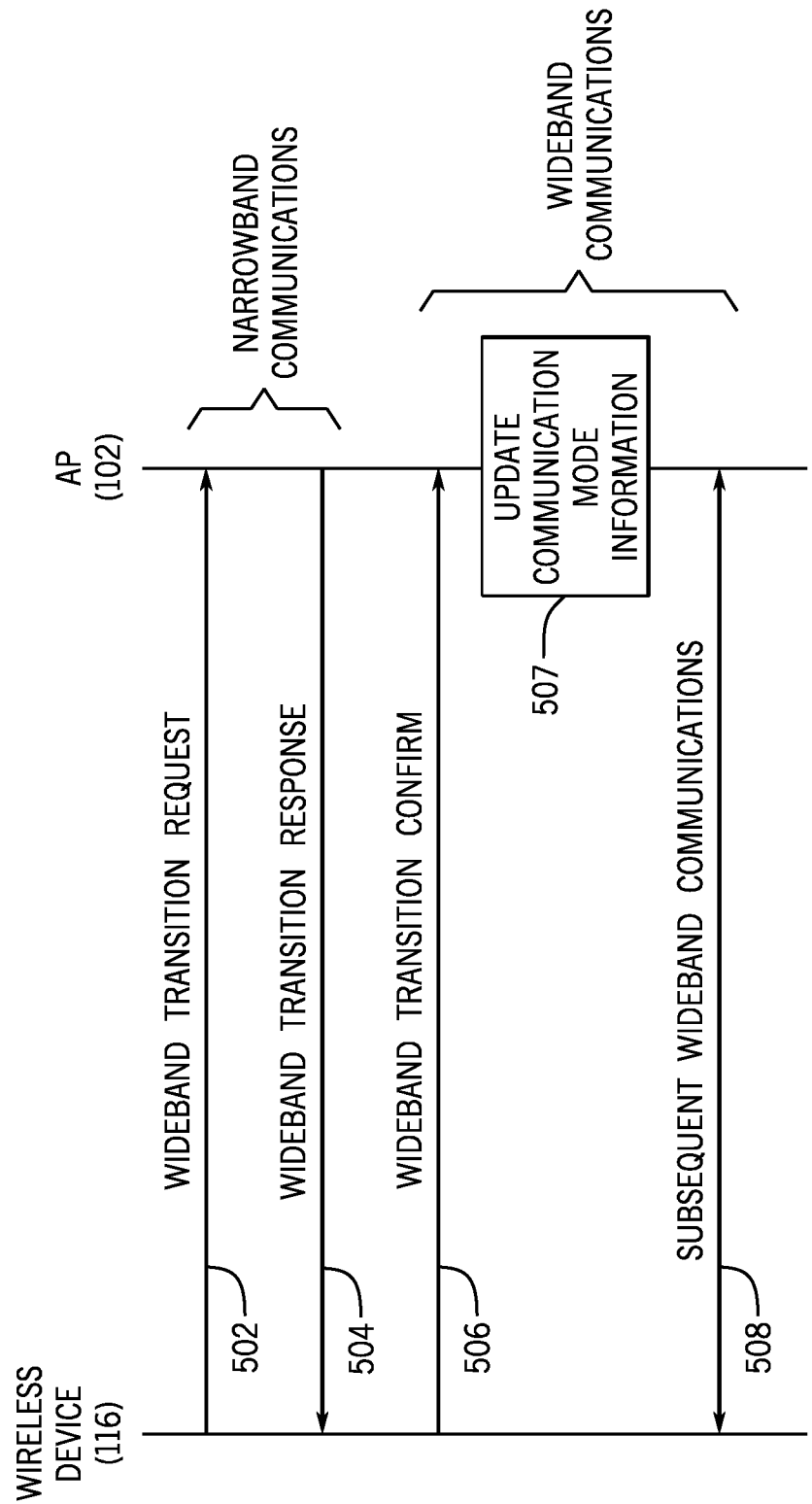

As shown in FIG. 5, the indication is in the form of a wideband transition request sent (at 502) by the wireless device 116 to the AP 102. The sending of the wideband transition request can be initiated by the wireless device 116, or alternatively, can be triggered by the AP 102 sending a trigger message (not shown) to the wireless device 116. The wideband transition request can contain a reason code.

The wideband transition request is sent from the wireless device 116 to the AP 102 over a narrowband network (using a narrowband channel) to inform the AP 102 of the wireless device's planned transition from the narrowband communication mode to the wideband communication mode.

The AP 102 responds to the wideband transition request by sending (at 504) to the wireless device 116 a wideband transition response over the narrowband network. The AP 102 may accept or reject the wideband transition request, and can indicate the acceptance or rejection in the wideband transition response using a reason code. One of the reasons the AP may reject the wideband transition request is because of lack of resources to serve the STA in that mode. This is a form of admission control to limit the number of devices simultaneously using the wideband channel.

In response to the wideband transition response (and assuming the wideband transition response contains an acceptance indication that accepts the wideband transition request), the wireless device 116 can move over to the wideband channel and start performing subsequent wideband communications (at 508) over the wideband network immediately, or alternatively, can send (at 506) a wideband transition confirm over the wideband network followed by performing subsequent wideband communications (at 508) on the wideband network.

In response to the wideband transition confirm (506) or receipt of frames over the wideband network (508), the AP 102 updates (at 507) the communication mode information for the wireless device 116, to indicate that the wireless device 116 is now operating in the wideband communication mode.

In some examples, the formats of the wideband transition request, wideband transition response, and wideband transition confirm can be similar to the formats of the narrowband transition request, narrowband transition response, and narrowband transition confirm discussed in section 1.1 above.

1.3 Direct Transition from the Narrowband Communication Mode to the Wideband Communication Mode This section describes examples where the indication that is sent (at 204) in FIG. 2 by the wireless device to an AP is a frame that provides an indication to transition from the narrowband communication mode to the wideband communication mode.

Figure 6:
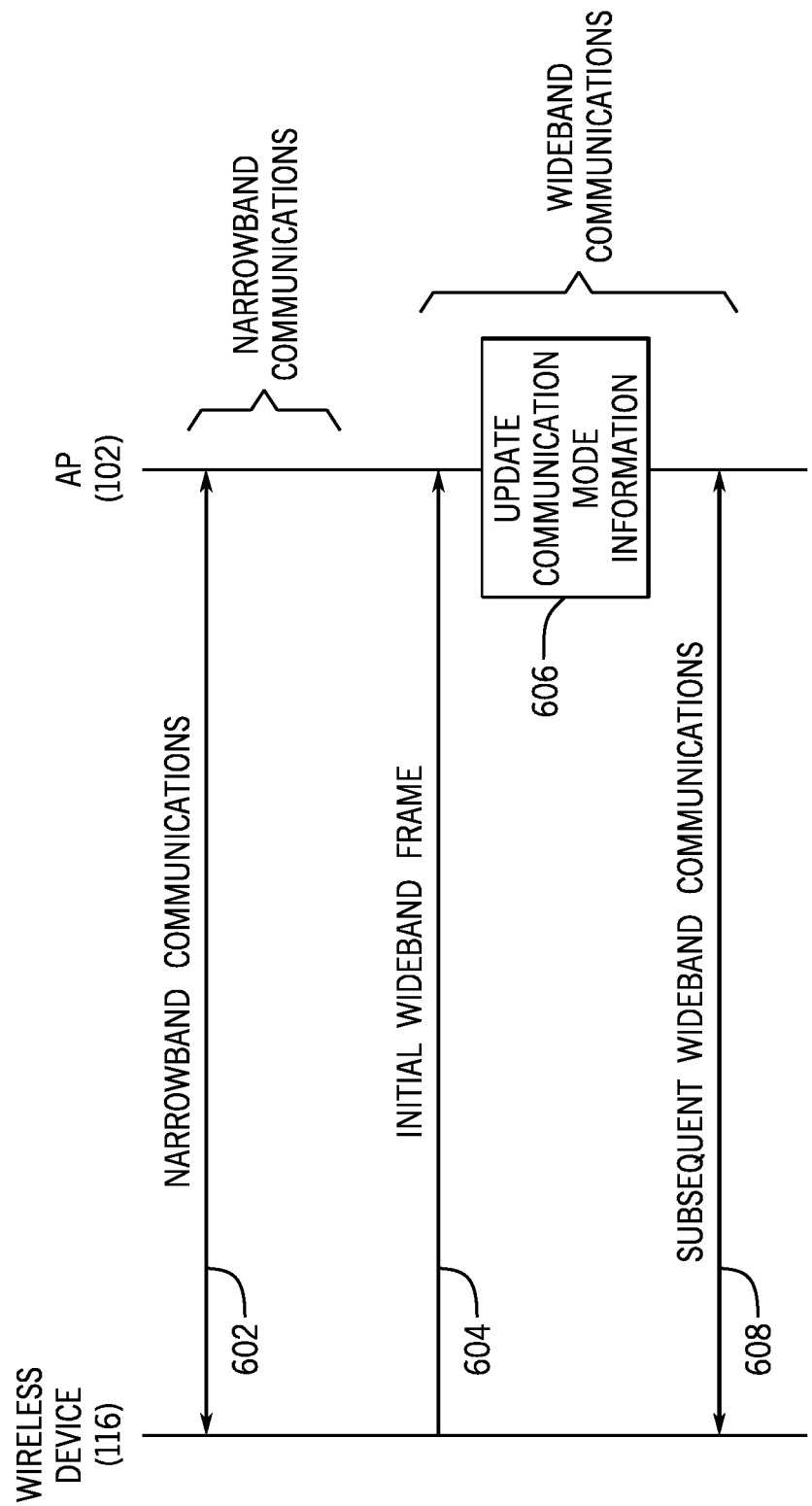

As shown in FIG. 6, the wireless device 116 is assumed to be operating in the narrowband communication mode and performs narrowband communications (at 602) with the AP 102 over the narrowband network. The wireless device 116 that is currently in the narrowband communication mode may send (at 604) an initial wideband frame to the AP 102 on a wideband channel at any time while the AP 102 is operating in the wideband communication mode. Based on the communication mode information maintained for the wireless device 116 by the AP 102, the AP 102 that receives the initial uplink wideband frame is aware that the wireless device 116 is currently in the narrowband communication mode. As a result, receipt of the initial wideband frame is an indication of a transition from the narrowband communication mode to the wideband communication mode.

In response to the receipt of the initial uplink wideband frame (at 604), the AP 102 updates (at 606) the communication mode information for the wireless device 116, to indicate that the wireless device 116 is now operating in the wideband communication mode. Subsequent communications between the wireless device 116 and the AP 106 include subsequent wideband communications (at 608) over the wideband network, until the wireless device 116 initiates a transition back to the narrowband communication mode.

As noted above, the AP 102 uses the same MAC address for the wireless device 116 on each of the wideband and narrowband networks. As a result, the AP 102 has to determine the channel (narrowband or wideband channel) over which a given frame is transmitted by the wireless device 116. This determination can be based on a PHY header included in the given frame. The PHY header can include information indicating which of the narrowband channel or wideband channel is used to transmit the given packet. The information in the PHY header indicating which of the narrowband channel or wideband channel is used to transmit the given packet can be passed to a MAC layer in the AP 102.

In further examples, in response to the AP 102 receiving a frame on the wideband channel from the wireless device 116 that is currently operating in the narrowband communication mode, the AP 102 can either (1) change the mode communication information for the wireless device 116 to indicate that the wireless device 116 has transitioned to the wideband communication mode such that any subsequent frames are communicated over the wideband channel, or (2) determine that the use of the wideband channel is for one frame (or some other predetermined number of frames) only. For example, a frame can include a flag (or other information) in the header of the frame, where the flag is settable to multiple values. A first value of the flag indicates that the wireless device 116 intends to return to the narrowband communication mode after a transmission of a single frame (or a predetermined number of frames) over the wideband channel.

A second value of the flag indicates that the wireless device 116 intends to change to the wideband communication mode for subsequent communications of frames (i.e., the wireless device 116 is transitioning to the wideband communication mode such that the wireless device 116 will continue to perform the subsequent communications in the wideband communication mode).

In some examples, the flag (or other information) may be encoded in a quality of service (QoS) Control Field or similar frame header. This information may be added to a data frame, or alternatively, may be added to management frames such as a Null data frame or QoS Null data frame or PS-Poll frame to indicate the wireless device's mode change intention.

If the AP 102 has any downlink frames queued for wireless device 116 while the wireless device 116 was in the narrowband communication mode, the initial wideband frame (sent at 604) may trigger the AP 102 to deliver the queued downlink frames on the wideband channel.

1.4 Direct Transition from the Wideband Communication Mode to the Narrowband Communication Mode This section describes examples where the indication that is sent (at 204) in FIG. 2 by the wireless device to an AP is an implicit indication to transition from the wideband communication mode to the narrowband communication mode.

Figure 7:
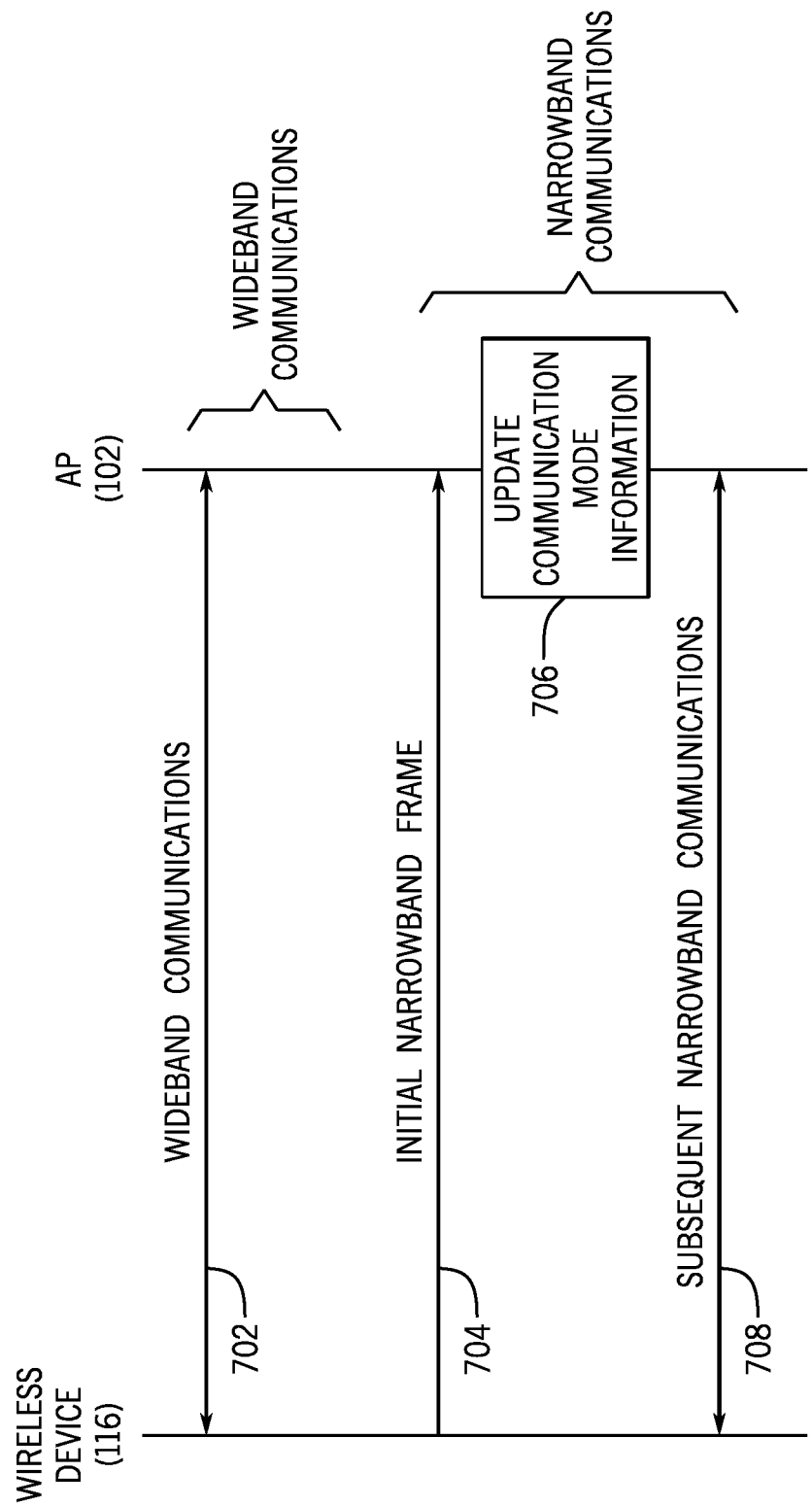

As shown in FIG. 7, the wireless device 116 is assumed to be operating in the wideband communication mode and performs wideband communications (at 702) with the AP 102 over the wideband network. The wireless device 116 that is currently in the wideband communication mode may send (at 704) an initial uplink narrowband frame to the AP 102 on a narrowband channel at any time while the AP 102 is operating in the narrowband communication mode. The wireless device 116 has to be able to receive downlink frames on the wideband channel up until the initial narrowband uplink frame is transmitted.

Note that in some examples the AP 102 may be configured to receive and decode narrowband frames at any time (even though this is resource intensive). In other examples the AP 102 may be configured to receive and decode narrowband frames at specific time intervals (and not to receive and decode narrowband frames at other time intervals different from the specific time intervals). In the latter examples, the wireless device 116 only transmits the initial uplink narrowband frame at one of the specific time intervals for narrowband operation.

Based on the communication mode information maintained for the wireless device 116 by the AP 102, the AP 102 that receives the initial uplink narrowband frame is aware that the wireless device 116 is currently in the wideband communication mode. As a result, receipt of the initial uplink narrowband frame is an implicit indication of a transition from the wideband communication mode to the narrowband communication mode.

In response to the receipt of the initial uplink wideband frame (at 704), the AP 102 updates (at 706) the communication mode information for the wireless device 116, to indicate that the wireless device 116 is now operating in the narrowband communication mode. Subsequent communications between the wireless device 116 and the AP 106 include subsequent narrowband communications (at 708) over the narrowband network, until the wireless device 116 initiates a transition back to the narrowband communication mode.

In further examples, in response to the AP 102 receiving a frame on the narrowband channel from the wireless device 116 that is currently operating in the wideband communication mode, the AP 102 can either (1) change the mode communication information for the wireless device 116 to indicate that the wireless device 116 has transitioned to the narrowband communication mode such that any subsequent frames are communicated over the narrowband channel, or (2) determine that the use of the narrowband channel is for one frame (or some other predetermined number of frames) only. For example, a frame can include a flag (or other information) in the header of the frame, where the flag is settable to multiple values. A first value of the flag indicates that the wireless device 116 intends to return to the wideband communication mode after a transmission of a single frame (or a predetermined number of frames) over the narrowband channel. A second value of the flag indicates that the wireless device 116 intends to change to the narrowband communication mode for subsequent communications of frames (i.e., the wireless device 116 is transitioning to the narrowband communication mode such that the wireless device 116 will continue to perform the subsequent communications in the narrowband communication mode).

The flag or other information in the frame can be implemented in a manner similar to that described in section 1.3 above.

1.5 Rate Sets and State

When the wireless device associates with an AP, a set of supported rates is exchanged. A "rate" can refer to a rate of communicating data between the wireless device and the AP. A rate can also correspond to a Modulation and Coding Scheme (MCS). The AP provides the wireless device with a set of supported rates (that are supported by the AP), including the following, as examples: high throughput (HT) rates, very high throughput (VHT) rates, high efficiency (HE) rates, and low power narrowband rates. Similarly, the wireless device provides the AP with a set of supported rates (that are supported by the wireless device), including the foregoing rates.

In some implementations of the present disclosure, the wideband communication mode and the narrowband communication mode can be implemented using respective distinct subsets of rates of a full set of rates. These subsets of rates are referred to as a wideband rate set (for the wideband communication mode) and a narrowband rate set (for the narrowband communication mode) in the ensuing discussion. The full set of rates are all of the rates that are mutually supported by the wireless device and the AP, while a subset of the full set of rates includes just a portion of the full set of rates. Although reference is made to one wideband rate set and one narrowband rate set in the present discussion, it is noted that there can be multiple wideband rate sets and/or multiple narrowband rate sets in other examples.

Based on the exchange of supported rates between the wireless device and the AP, each of the wireless device and AP can determine the supported rates for the wideband rate set and the narrowband rate set, and each of the wireless device and AP can store the wideband rate set and the narrowband rate set. More generally, the wireless device can receive, from the AP, a first rate set including one or more supported rates for communication over a wideband channel, and a second rate set including one or more supported rates for communication over a narrowband channel. Similarly, the AP can receive, from the wireless device, a first rate set including one or more supported rates for communication over a wideband channel, and a second rate set including one or more supported rates for communication over a narrowband channel.

Signaling can be exchanged between the wireless device and the AP to switch between the wideband and narrowband rate sets. This signaling is an alternative to the pre-transition indication described in sections 1.1 and 1.2 used for triggering a transition between the wideband communication mode and the narrowband communication mode. In some examples, a transition between the wideband communication mode and the narrowband communication mode can be implemented as a change in the rate set used (i.e., a change between the wideband and narrowband rate sets), since the rate set used indicates the communication mode.

The AP can control the transition of the wireless device between the wideband communication mode and the narrowband communication mode by implementing a change in the currently supported rate set that is exchanged with the wireless device at the time of association between the wireless device and the AP. For example, when the wireless device is in the wideband communication mode, the currently used rate set is a subset of the full set of rates, where the subset can include just the HT and VHT rates. When the wireless device is in the narrowband communication mode, the currently used rate set is a different subset of the full set of rates, where the different subset can include just the narrowband rates.

In some examples, the signaling that can be used to trigger a change in rate sets can include a Traffic Specification (TSPEC) message or a Block ACK message transmitted between the wireless device and the AP. Typically, the full rate set would be exchanged at the time of association between the wireless device and the AP. The foregoing signaling can be used to switch between two (or more) distinct subsets of the full rate set. Alternatively, the full rate set or subset of rates may be exchanged in the foregoing signaling when changing communication modes.

An explicit division of the full rate set can be performed at association time to group the rates of the full rate set into the wideband rate set and the narrowband rate set. Alternatively, the wideband rate set and the narrowband rate set can be implicitly based on a definition of the narrowband rate set being distinct from other rate sets.

For example, the narrowband rate set can be specified in an addition entry of a MAC layer management entity (MLME) Join Request, or an MLME Start Request, where the MLME Join Request and MLME Start Request are explained in IEEE 802.11-2016. In other examples, the narrowband rate set can be specified in a different message. The MLME is a management entity that provides management service interfaces through which layer management functions may be invoked for the MAC layer. The Join Request and the Start Request are used as part of the management functions for the MAC layer.

As noted above, TSPEC messages can be used as signaling to trigger a change between a wideband rate set and a narrowband rate set. For example, TSPEC Add Traffic Stream (ADDTS) request and response messages can be used. ADDTS is described in IEEE 802.11-2012. The ADDTS request and response messages can be used to negotiate adding and removing of traffic streams (TS). The primitives used for the foregoing are referred to as TS Management primitives, which include MLME-ADDTS.yyy and MLME-DELTS.yyy primitives, where yyy denotes request, confirm, indication, or response. An additional entry can be included in the MLME-ADDTS.indication( ) confirm( ) or response( ) primitive, where the additional entry can include an indication for controlling selection of a subset of rates (selection between the wideband rate set and narrowband rate set). Note that there can be multiple wideband rate sets, referred to as OperationalRateSet and HTOperationalRateSet, where the HTOperationalRateSet includes rates that are HT rates not included in the OperationalRateSet.

In further examples noted above, Block ACK messages can be used as signaling to trigger a change between a wideband rate set and a narrowband rate set. Similar to the TSPEC negotiation, the rate set can be changed during the Block ACK agreement procedure. A first indicator (e.g., a bit or flag) in a Block ACK message is defined to indicate support of the multiple operational rate sets (wideband and narrowband rate sets). A second indicator in the Block ACK message is used to switch between the multiple rate sets. For example, a first value of the second indicator indicates use of a wideband rate set, while a second, different value of the second indicator indicates use of a narrowband rate set. Alternatively, the second indicator can indicate a state change where a first value indicates use of a current rate set, and a second value indicates a change of rate set.

2. Discovering a Narrowband Network

The following describes examples of how the communication mode transition of section 1 can be used as part of a network discovery process for a wireless device (e.g., the wireless device 116) that typically operates in the narrowband channel.

Figure 8:
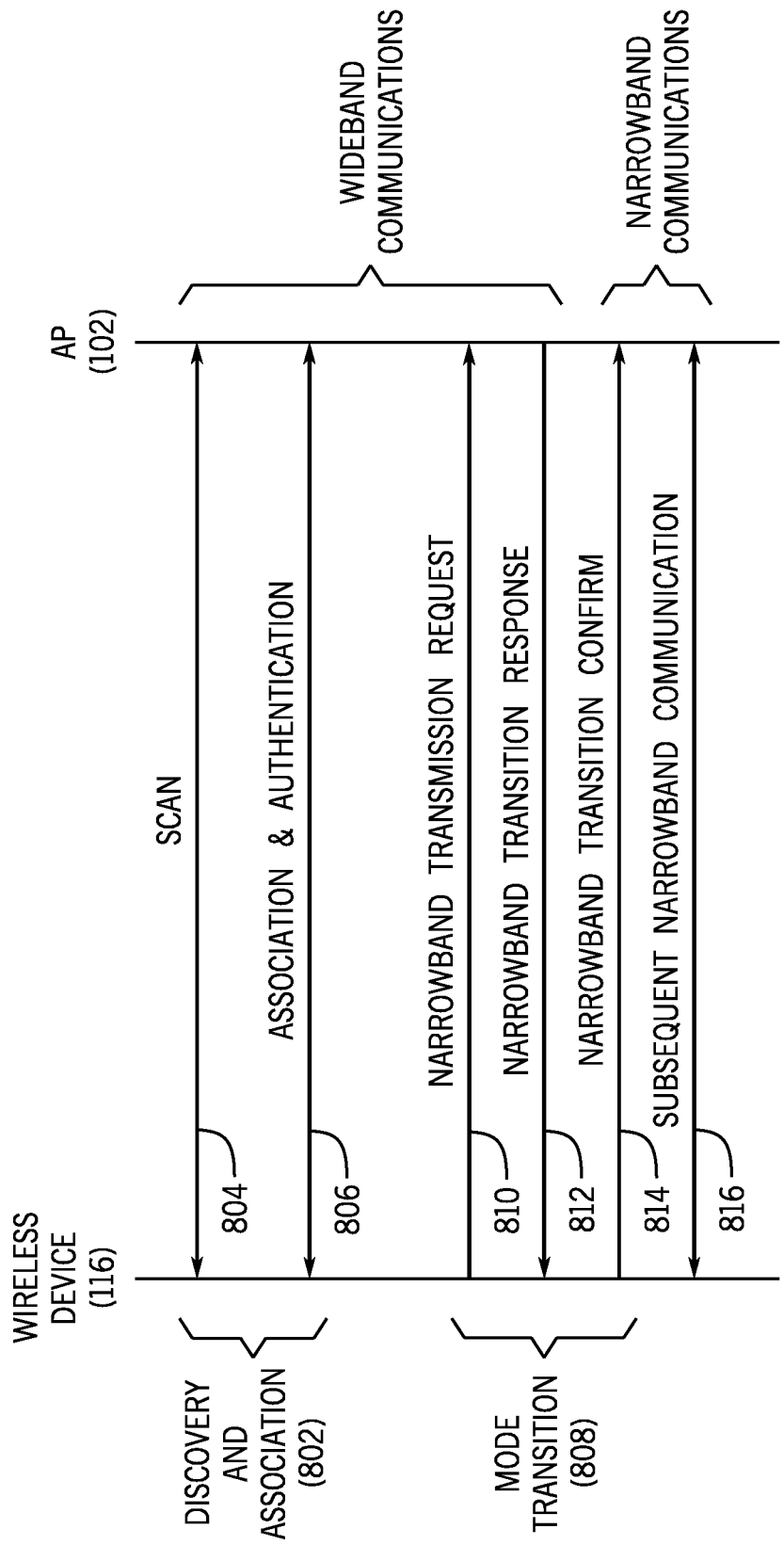
FIG. 8 is a flow diagram of discovering and associating with an access point, followed by a transition from a wideband communication mode to a narrowband communication mode, according to further implementations.

The process of the wireless device 116 connecting to the network is shown in FIG. 8. It involves three main stages: (1) discovery and association performed in the wideband channel, (2) a communication mode transition from operating in the wideband channel to the narrowband channel, and (3) continued operation in the narrowband channel.

As shown in FIG. 8, discovery and association 802 performed between the wireless device 116 and AP 102 includes scanning (at 804), by the wireless device 116, the wideband channels, such as according to IEEE 802.11, where the scanning can include active scanning or passive scanning. The scanning identifies one or more APs. The discovery and association 802 further includes performing association and authentication 806, where the association and authentication 806 includes the following tasks:

806.1) For each AP detected, the wireless device 116 determines if the AP is narrowband capable—the wireless device 116 can make this determination based on a capability bit in the beacon or probe response, or an Access Network Query Protocol (ANQP) response.

806.2) The wireless device 116 selects, from among the detected APs, an AP to associate with, using the narrowband capabilities of the APs as a factor in the selection. For example, the wireless device 116 excludes from consideration any detected AP that does not support narrowband communications, such that the wireless device 116 would not select the AP without narrowband support.

806.3) The wireless device 116 connects to the selected AP using a regular wideband association procedure, such as according to IEEE 802.11.

806.4) The wireless device 116 receives information or parameters for the operation in the narrowband communication mode.

The wireless device 116 then performs a mode transition (808), which includes informing the AP of the communication mode change from the wideband communication mode to the narrowband communication mode. For example, using the indication technique of section 1.1 above, the wireless device 116 sends (at 810), to the AP 102, a narrowband transition request, receives (at 812), from the AP 102, a narrowband transition response, and sends (at 814), to the AP 102, a narrowband transition confirm.

The wireless device 116 and the AP 102 can then perform subsequent narrowband communications (at 816).

In alternative examples, the narrowband capability may not be advertised by APs or may not be available prior to association. If this is the case, then tasks 804 and 806.1-806.3 follow traditional WLAN procedures, while tasks 806.4 and 810-816 follow the procedures described in the present disclosure.

In further examples, the wireless device 116 receives sufficient information in task 806.1 such that task 806.4 or task 808 does not have to be performed.

For a wireless device that is specifically designed as a low power device (for operation in the narrowband communication mode), the wideband communication mode may only be used for associating to the AP. For this type of wireless device, following association with the AP in the wideband communication mode, the wireless device will immediately transition to the narrowband communication mode and remain operating in that mode for the rest of the association to the AP.

3. System Architecture

Figure 9:
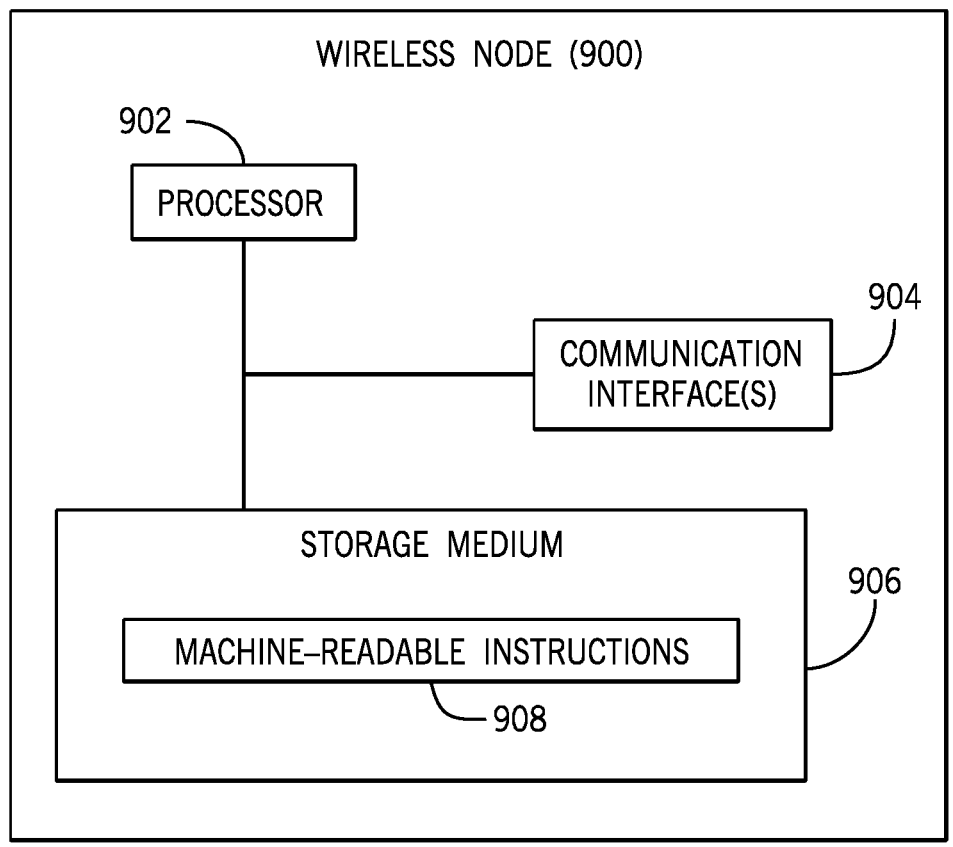
FIG. 9 is a block diagram of a wireless node according to some examples.

FIG. 9 is a block diagram of a wireless node 900, which can be a wireless device (e.g., a non-AP STA) or an AP. The wireless node 900 includes a processor (or multiple processors) 902, which can be coupled to one or more communication interface(s) 904 to communicate over a wireless link, and to a non-transitory machine-readable or computer-readable storage medium 906 storing machine-readable instructions 908 executable on the processor(s) 902 to perform various tasks as described above.

A processor can include a microprocessor, a core of a multi-core microprocessor, a microcontroller, a programmable integrated circuit, a programmable gate array, or another hardware processing circuit.

The storage medium 906 can include one or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
    scanning, by a wireless device, wideband channels to detect an access point;
    associating, by the wireless device, with the access point using a particular wideband channel of the wideband channels;
    after associating with the access point using the particular wideband channel, sending, by the wireless device to the access point, an indication that the wireless device is to transition from a wideband communication to a narrowband communication; and
    receiving, by the wireless device from the access point, a rate set including a plurality of supported rates for communication over a narrowband channel for the narrowband communication, wherein the rate set is a first rate set, and the indication comprises an indication to change from a second rate set comprising a plurality of supported rates for communication over a wideband channel, to the first rate set.

2. The method of claim 1, wherein the scanning causes the wireless device to detect a plurality of access points, the method further comprising:
   determining, by the wireless device, which of the plurality of access points is capable of the narrowband communication; and
   selecting, by the wireless device, the access point based on the determining.

3. The method of claim 2, wherein the selecting excludes an access point that does not support the narrowband communication.

4. The method of claim 1, further comprising:
   communicating, through a narrowband interface of the wireless device over the narrowband channel, data with the access point using a rate of the rate set during a time that the wireless device is performing the narrowband communication.

5. The method of claim 1, wherein sending the indication comprises sending a request to transition between the wideband communication and the narrowband communication, and wherein the request comprises information relating to a narrowband communication mode to which the wireless device is to transition.

6. The method of claim 5, further comprising:
   receiving, by the wireless device from the access point in response to the request, updated information relating to an operation of a network.

7. The method of claim 5, further comprising:
   receiving, by the wireless device from the access point, a response rejecting the request, the response containing a reason code for the rejecting.

8. The method of claim 1, further comprising:
   after associating with the access point using the particular wideband channel, sending, by the wireless device, an uplink frame in a narrowband communication mode to indicate a transition from the wideband communication to the narrowband communication.

9. The method of claim 8, wherein the uplink frame includes information settable to:
   a first value indicating that the wireless device is to send a predetermined number of uplink frames in the narrowband communication mode followed by a transition back to a wideband communication mode, and
   a second value indicating that the wireless device is to continue communicating in the narrowband communication mode.

10. The method of claim 1, wherein the indication comprises a Traffic Specification (TSPEC) message or a Block ACK message.

11. A wireless device comprising:
   a wideband communication interface to communicate over a wideband channel, and a narrowband communication interface to communicate over a narrowband channel;
   at least one processor configured to:
      control scanning, by the wireless device, of wideband channels to detect an access point;
      associate the wireless device with the access point using a particular wideband channel of the wideband channels;
      after associating with the access point using the particular wideband channel, send, from the wireless device to the access point, an indication that the wireless device is to transition from a wideband communication to a narrowband communication; and
      receive, at the wireless device from the access point, a rate set including a plurality of supported rates for communication over the narrowband channel for the narrowband communication, wherein the rate set is a first rate set, and the indication comprises an indication to change from a second rate set comprising a plurality of supported rates for communication over a wideband channel, to the first rate set.

12. The wireless device of claim 11, wherein the scanning causes the wireless device to detect a plurality of access points, wherein the at least one processor is further configured to:
   determine which of the plurality of access points is capable of the narrowband communication; and
   select the access point based on the determining.

13. The wireless device of claim 12, wherein the selecting excludes an access point that does not support the narrowband communication.

14. The wireless device of claim 11, wherein the wireless device is to communicate, through the narrowband communication interface over the narrowband channel, data with the access point using a rate of the rate set during a time that the wireless device is performing the narrowband communication.

15. The wireless device of claim 11, wherein the indication comprises a request to transition between the wideband communication and the narrowband communication, and wherein the request comprises information relating to a narrowband communication mode to which the wireless device is to transition.

16. The wireless device of claim 15, wherein the at least one processor is further configured to:
   receive, at the wireless device from the access point in response to the request, updated information relating to an operation of a network.

17. The wireless device of claim 11, wherein the at least one processor is further configured to:
   after associating with the access point using the particular wideband channel, send, from the wireless device, an uplink frame in a narrowband communication mode to indicate a transition from the wideband communication to the narrowband communication.

18. The wireless device of claim 17, wherein the uplink frame includes information settable to:
   a first value indicating that the wireless device is to send a predetermined number of uplink frames in the narrowband communication mode followed by a transition back to a wideband communication mode, and
   a second value indicating that the wireless device is to continue communicating in the narrowband communication mode.

19. A non-transitory machine-readable storage medium comprising instructions that upon execution cause a wireless device to:
   scan wideband channels to detect an access point;
   associate the wireless device with the access point using a particular wideband channel of the wideband channels;
   after associating with the access point using the particular wideband channel, send, from the wireless device to the access point, an indication that the wireless device is to transition from a wideband communication to a narrowband communication; and
   receive, at the wireless device from the access point, a rate set including a plurality of supported rates for communication over a narrowband channel for the narrowband communication, wherein the rate set is a first rate set, and the indication comprises an indication to change from a second rate set comprising a plurality of supported rates for communication over a wideband channel, to the first rate set.

* * * * *